US012521629B2

(12) United States Patent
Takano

(10) Patent No.: US 12,521,629 B2
(45) Date of Patent: Jan. 13, 2026

(54) LIVE IMAGE DISPLAY SUPPORT APPARATUS, GAME SYSTEM, AND LIVE IMAGE DISPLAY SUPPORT METHOD

(71) Applicant: Sony Interactive Entertainment Inc., Tokyo (JP)

(72) Inventor: Akihiro Takano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 293 days.

(21) Appl. No.: 18/256,468

(22) PCT Filed: Dec. 17, 2020

(86) PCT No.: PCT/JP2020/047156
§ 371 (c)(1),
(2) Date: Jun. 8, 2023

(87) PCT Pub. No.: WO2022/130568
PCT Pub. Date: Jun. 23, 2022

(65) Prior Publication Data
US 2024/0024772 A1 Jan. 25, 2024

(51) Int. Cl.
*A63F 13/5258* (2014.01)
*A63F 13/30* (2014.01)
*A63F 13/5372* (2014.01)
*G06T 17/05* (2011.01)
*G06V 10/762* (2022.01)
*A63F 13/86* (2014.01)

(52) U.S. Cl.
CPC .......... *A63F 13/5258* (2014.09); *A63F 13/30* (2014.09); *A63F 13/5372* (2014.09); *G06T 17/05* (2013.01); *G06V 10/762* (2022.01); *A63F 13/86* (2014.09)

(58) Field of Classification Search
None
See application file for complete search history.

(56) References Cited

U.S. PATENT DOCUMENTS

| | | | | |
|---|---|---|---|---|
| 7,176,920 B1 * | 2/2007 | Billyard | .................. | A63F 13/30 345/473 |
| 2021/0346802 A1 * | 11/2021 | Guan | ...................... | A63F 13/35 |
| 2021/0387089 A1 * | 12/2021 | McCoy | ................... | A63F 13/35 |

FOREIGN PATENT DOCUMENTS

| | | |
|---|---|---|
| JP | 8215433 A | 8/1996 |
| JP | 11253659 A | 9/1999 |
| JP | 2001000749 A | 1/2001 |

(Continued)

OTHER PUBLICATIONS

International Search Report for corresponding PCT Application No. PCT/JP2020/047156, 4 pages, dated Mar. 9, 2021.

*Primary Examiner* — Damon J Pierce
(74) *Attorney, Agent, or Firm* — Kilpatrick Townsend & Stockton LLP

(57) ABSTRACT

Pieces of game data are stored in a game data storage section in the process of game processing. A game server then transmits, among them, game parameters such as scores and positions of characters and data such as the three-dimensional structure of a virtual world to a live image display support apparatus. The live image display support apparatus performs prioritization and clustering by using the game parameters and generates control information such as the state of a virtual camera on the basis of a normal and the like of the ground in the virtual world.

16 Claims, 10 Drawing Sheets

(56) References Cited

FOREIGN PATENT DOCUMENTS

| | | | |
|---|---|---|---|
| JP | 2017225509 | A | 12/2017 |
| KR | 2020074817 | A | 6/2020 |

* cited by examiner

LIVE IMAGE DISPLAY SUPPORT APPARATUS, GAME SYSTEM, AND LIVE IMAGE DISPLAY SUPPORT METHOD

TECHNICAL FIELD

The present invention relates to a live image display support apparatus, a game system, and a live image display support method that support display of a live image of an electronic game.

BACKGROUND ART

In recent years, computer games are not only enjoyed by individuals, but it has become common that a plurality of players participate in one game via a network and other users watch the game. In particular, the development of e-sports (Electronic Sports) in which computer games are regarded as competitions and held in the form of tournaments has been remarkable, and many events are held where individuals or teams compete with large amounts of prize money in front of a large number of spectators.

[Summary] [Technical Problems]

In online games, such as e-sports, accompanied by spectators, how to present a live video to the spectators is an important task. In particular, in the case of a game in which characters operated by players can freely move around in a virtual world or a viewpoint of each player can freely be moved, a game screen viewed by each player varies. For this reason, it is necessary to separately perform the work of appropriately selecting and generating a live video for spectators. If this work is not done appropriately, it is not possible to present interesting scenes and important moments, as a result of which the spectators feel stressed and the event lacks excitement.

The present invention has been made in view of such problems, and it is an object of the present invention to provide a technique for easily displaying a live video of an electronic game with appropriate contents.

Solution to Problem

An aspect of the present invention relates to a live image display support apparatus. The live image display support apparatus is an apparatus that supports display of a live image of an electronic game and includes a data acquisition section configured to extract predetermined game parameters acquired in game processing based on an operation performed by each player and a control information generation section configured to generate and output control information relating to a suitable field of view of the live image by aggregating the game parameters.

Another aspect of the present invention relates to a game system. The game system includes a game server configured to process an electronic game in cooperation with player devices and output predetermined game parameters acquired in game processing based on an operation performed by each player and a live image display support apparatus configured to generate and output control information relating to a suitable field of view of a live image of the electronic game by aggregating the game parameters.

Still another aspect of the present invention relates to a live image display support method. The live image display support method includes, by an apparatus that supports display of a live image of an electronic game, a step of extracting predetermined game parameters acquired in game processing based on an operation performed by each player and a step of generating and outputting control information relating to a suitable field of view of the live image by aggregating the game parameters.

It is noted that any combinations of the constituent components described above and conversions of the representations of the present invention between a method, an apparatus, a system, a computer program, a recording medium recording a computer program, and the like are also effective as modes of the present invention.

Advantageous Effect of Invention

According to the present invention, it is possible to easily display a live video of an electronic game with appropriate contents.

DESCRIPTION OF EMBODIMENT

Figure 1:
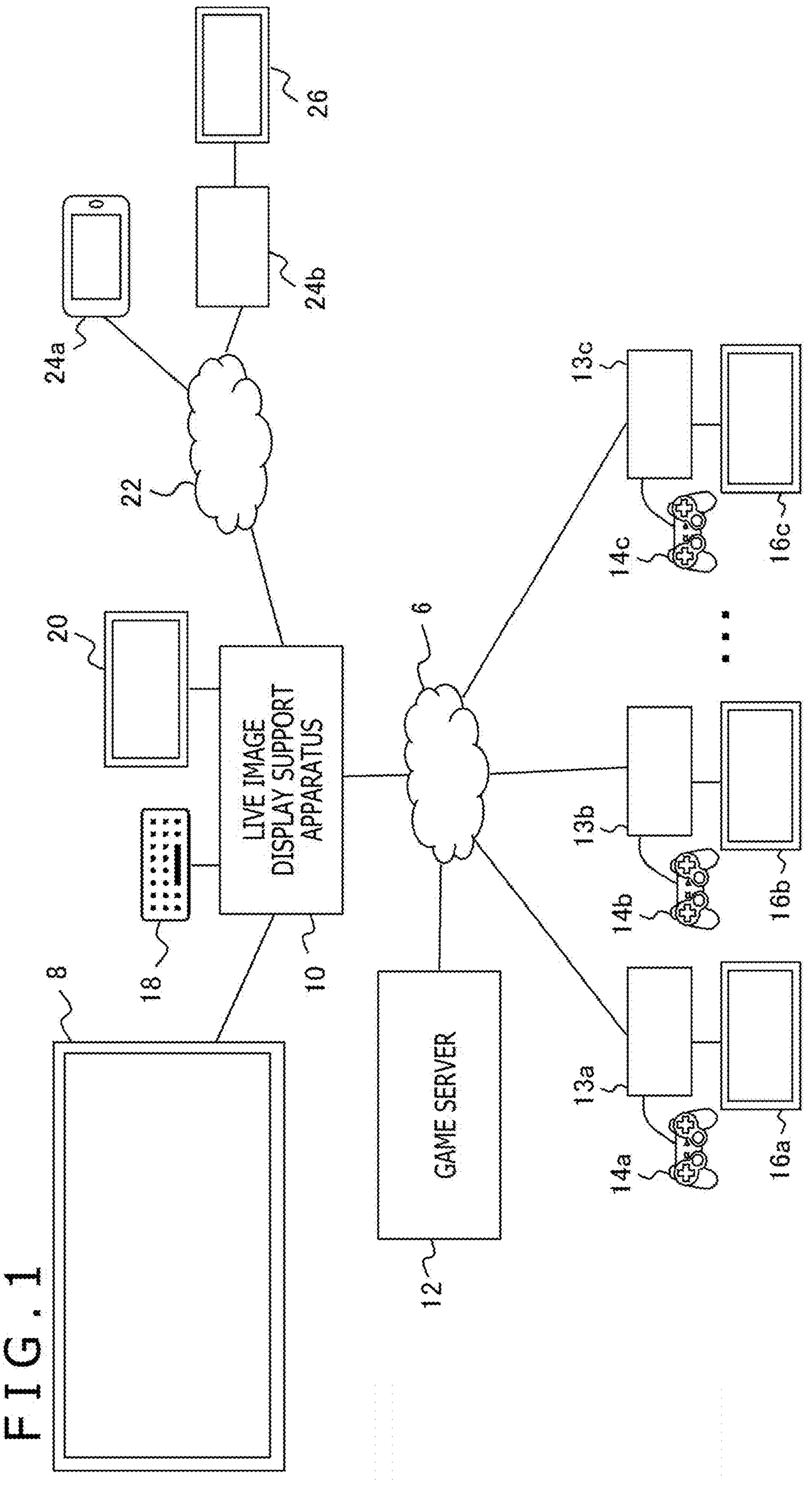
FIG. 1 is a diagram exemplifying a game system to which a present embodiment can be applied.

FIG. 1 exemplifies a game system to which a present embodiment can be applied. The game system can typically be used for e-sports events, but there are no limitations on the scale and location as long as a live video of an electronic game in which a plurality of players are participating is presented to others. The game system includes a configuration in which a plurality of player devices 13*a*, 13*b*, 13*c*, . . . are connected to a game server 12 via a network 6 such as a LAN (Local Area Network).

The player devices 12*a*, 12*b*, 12*c*, . . . are terminals, each of which is operated by a player, and are respectively connected to input apparatuses 14*a*, 14*b*, 14*c*, . . . and player displays 16a, 16b, 16c, . . . by wire or wirelessly. Hereinafter, the player devices 13a, 13b, 13c, . . . are collectively referred to as player devices 13, the input apparatuses 14a, 14b, 14c, . . . as input apparatuses 14, and the displays 16a, 16b, 16c, . . . as player displays 16.

The number of player devices 13, input apparatuses 14, and player displays 16 included in the system is not particularly limited to any number. The player devices 13 may be any of personal computers, dedicated game machines, content processing apparatuses, and the like. The input apparatuses 14 may be general controllers that accept user operations for a game. The player displays 16 may be general flat panel displays or wearable displays such as head-mounted displays.

It is noted that the player devices 13, the input apparatuses 14, and the player displays 16 may each include a separate housing as illustrated in the figure or two or more of them may integrally be provided. For example, mobile terminals or the like each integrally including the player device 13, the input apparatus 14, and the player display 16 may be used.

The game server 12 establishes communication with each player device 13 and executes the game by using a client-server system. That is, the game server 12 collects, from each player device 13, game data based on the operation by each player to progress the game. Then, the game server 12 returns data including results of operations performed by other players, such that the data are reflected on game screens of the player displays 16. Such operations of the player devices 13 and the game server 12 may be general operations.

In the game system according to the present embodiment, a live image display support apparatus 10 is further connected to the game server 12 and the like. The live image display support apparatus 10 causes a spectator display 8 to display a live image representing how a game world progresses according to the operation by each player. The spectator display 8 is, for example, a flat display that can be viewed by a plurality of spectators together, such as a large screen installed at an e-sports event venue. The live image display support apparatus 10 may be connected to an input apparatus 18 for a live image administrator and an administrator display 20, in addition to the spectator display 8.

The live image display support apparatus 10 may also transmit data of a live image to terminals 24a and 24b for spectators via a network 22. The network 22 may be a WAN (Wide Area Network), a LAN, or the like, and there is no limitation on the scale thereof. Therefore, the spectators using the terminals 24a and 24b may be in the same space as the players, such as an event venue, or may be in different locations, such as remote locations.

As illustrated in the figure, each of the terminals 24a and 24b for the spectators may be a mobile terminal including a display or may be an information processing apparatus, a content reproduction apparatus, or the like that causes a connected display 26 to display an image. The display 26 may be a flat display or a wearable display such as a head-mounted display. Further, the number of terminals 24a and 24b for the spectators is not limited to any number. Hereinafter, the terminals 24a and 24b for the spectators are collectively referred to as terminals 24.

In any case, in the present embodiment, the live image display support apparatus 10 collects predetermined information relating to a situation of the game from the game server 12 and generates, on the basis of this, information that can be used to determine a field of view of the live image. The live image display support apparatus 10 may control the live image by itself by using the generated information. Alternatively, the live image display support apparatus 10 may cause the administrator display 20 to display this information, and the live image administrator may finally control the live image by using the input apparatus 18. In this mode, the input apparatus 18 is a general controller, keyboard, operation panel, switch, or the like and can be used when the administrator controls the live image.

The administrator display 20 functions as a monitor for the administrator to view various kinds of information and the live image. It is noted that the live image display support apparatus 10 may be part of the game server 12. For example, the live image display support apparatus 10 may implement a function of generating information for controlling the live image and a function of generating the live image as part of game software that is executed by the game server 12, to suppress external exposure of the game data. Further, the live image display support apparatus 10 may establish communication with the player devices 13 and acquire game-related data from the player devices 13.

Figure 2:
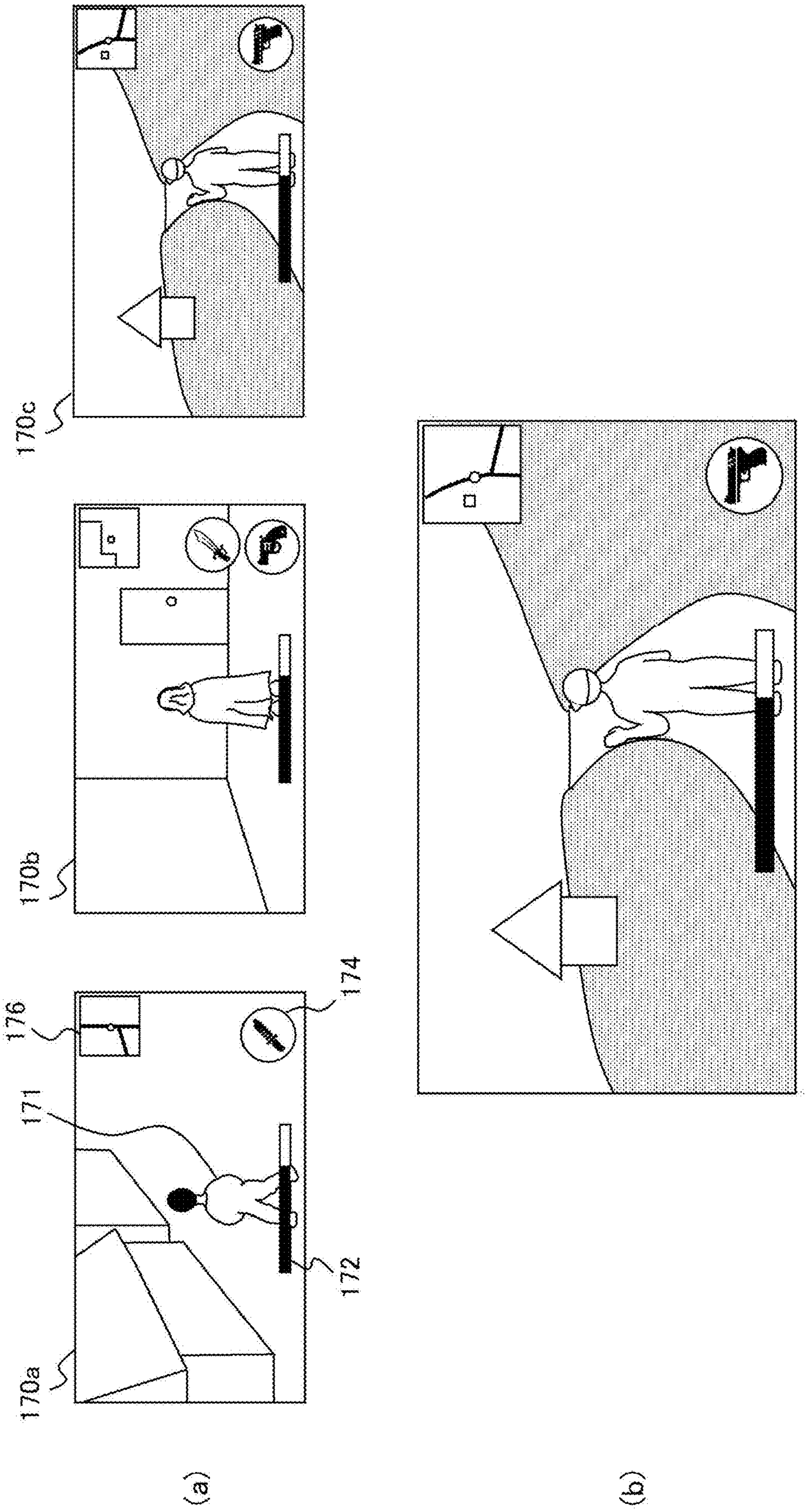
FIG. 2 is a view schematically illustrating an example of player images and a live image for watching a game.

Here, in order to clarify the effects of the present embodiment, a live image to be displayed in general e-sports is described. FIG. 2 schematically illustrates an example of player images and alive image for watching the game. A game assumed in this example is a game in which characters operated by players move around a virtual world and fight against enemy characters encountered. (a) exemplifies player images viewed by respective players on their displays. In this example, in each of player images 170a, 170b, and 170c, a back view of a character (e.g., a character 171) operated by a corresponding player is placed in the vicinity of the bottom of the center, and its surrounding virtual world is represented at a predetermined angle of view.

When the players perform operations to move their own characters via the input apparatuses 14, virtual cameras fixed behind the characters follow their movement, thereby changing the surrounding scenery represented in the player images 170a, 170b, and 170c. A game in such a display format is a general one called TPS (Third Person Shooting). However, there is no intention to limit the type of game targeted by the present embodiment thereto.

In many cases, individual information required for gameplay is superimposed and displayed on the player images 170a, 170b, and 170c. In the illustrated example, a hit point (HP) gauge (e.g., a gauge 172) representing the remaining physical strength of each character, an icon (e.g., an icon 174) indicating a weapon possessed by each character, a map (e.g., a map 76) indicating the current location of each character in the virtual world, and the like are displayed. If individual characters are present in different locations in the virtual world as illustrated in the figure, the locations represented in the player images 170a, 170b, and 170c are also naturally different from each other. In a situation in which a plurality of characters are present or fighting in the same location, the locations represented in the player images 170a, 170b, and 170c are the same, but the field of view can vary depending on the orientation of the character and the operation by the player.

(b) illustrates an example of the live image displayed on a large screen in a venue, terminals of spectators, or the like. In this example, the certain player image 170c is selected and used as it is as the live image. In this case, there is no need to generate a live image separately, and processing can be simplified. On the other hand, since a player image is originally used for gameplay itself, spectators may not always enjoy watching the player image. Therefore, there may be a difference in the excitement of the venue, depending on which player image is selected.

For example, if a character in the selected player image is immediately defeated, it is necessary to reselect the next display target. If this kind of thing happens frequently, the spectators are forced to view one scene after another without any context. This makes it difficult for them to immerse themselves in the game world. This similarly applies to a case where the plurality of player images 170*a*, 170*b*, and 170*c* are periodically switched and displayed. Further, the excitement is hindered if the character of the selected player image avoids battles and continues to stay in an advantageous position or if there are no other characters around and a situation in which no battles occur continues unintentionally.

Therefore, it is conceivable to set an independent virtual camera and generate an image separately, instead of using the player image 170*a*, 170*b*, or 170*c* as the live image. In this case, since the position and pose of the virtual camera can freely be moved and switched, it is possible to allow spectators to view interesting scenes and important moments that are expected to heat up. However, a large number of personnel and a high level of skills are required in order to grasp the situations of all of the characters and appropriately switch the screens or change the field of view. This results in an increase in the cost. For this reason, the smaller the event in which funds are not enough, the poorer the live image and the less exciting the event becomes.

Therefore, the live image display support apparatus 10 according to the present embodiment can collect the situation and the like of each character to use them for live image control. That is, the live image display support apparatus 10 acquires, from the game server 12, predetermined parameters that are acquired/generated in the game and uses them to generate predetermined information that serves as a basis for the live image control. Hereinafter, parameters collected in the game are referred to as "game parameters," and the information for the live image control generated by the live image display support apparatus 10 is referred to as "control information." It is noted that the control information may include game parameters themselves.

As a typical example, game parameters are pieces of information for each player and each character and are data that are necessary for game processing and that are acquired by a program of the game on the basis of the operation by each player. The control information is acquired by aggregating the game parameters and is information relating to a suitable field of view of the live image, for example, information suggesting a desirable character or location to be displayed. For example, the live image display support apparatus 10 acquires position information of each character in the virtual world as a game parameter. Then, the live image display support apparatus 10 generates, as the control information, a group of characters, that is, a location where a cluster is formed.

Moreover, the live image display support apparatus 10 may generate a suitable position and pose (a viewpoint position and a line-of-sight direction) of the virtual camera as the control information on the basis of how the characters are distributed at the location, the terrain in the virtual world, and the like. It is noted that the control information may be used not only for generating the live image independent of the player images, but also for selecting a player image to be used as the live image. That is, the live image according to the present embodiment may be an image generated independently of the player images or may be any one of the player images. Alternatively, they may be switched and displayed.

As described above, the live image display support apparatus 10 may generate the live image or switch screens by itself on the basis of the control information or may allow the live image administrator to perform a final operation. In the latter case, the live image display support apparatus 10 supports the work of the live image administrator by displaying the control information on the administrator display 20. In any case, the live image display support apparatus 10 collects the game parameters useful for controlling the live image in real time, so that the appropriate live image can easily be displayed with much less effort.

Figure 3:
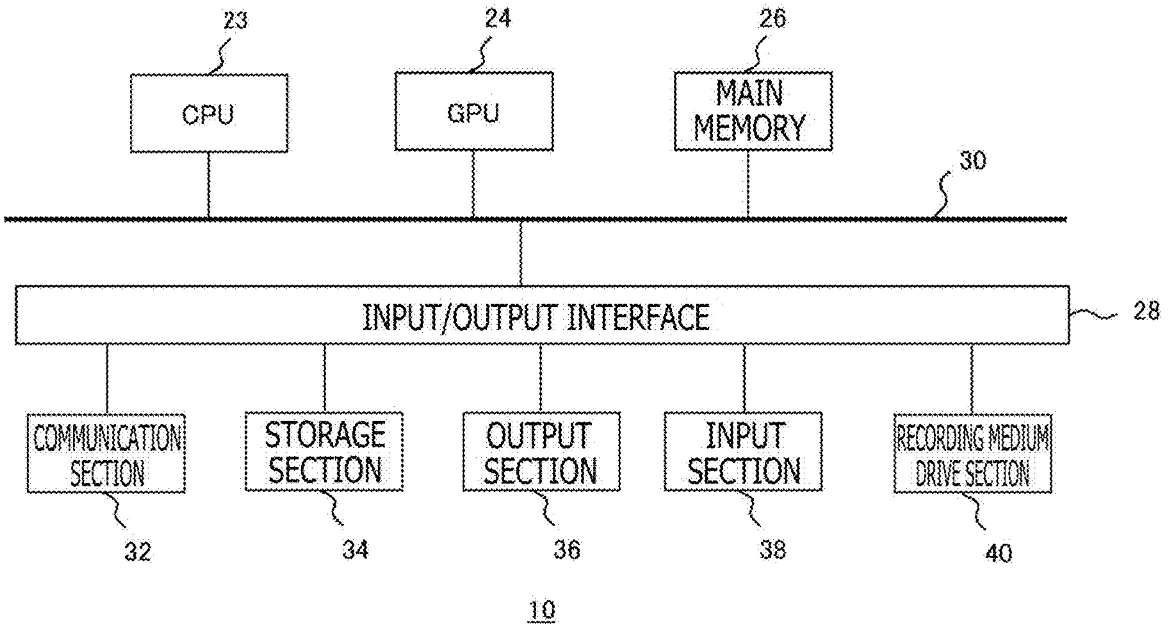
FIG. 3 is a diagram illustrating an internal circuit configuration of a live image display support apparatus according to the present embodiment.

FIG. 3 illustrates an internal circuit configuration of the live image display support apparatus 10. The live image display support apparatus 10 includes a CPU (Central Processing Unit) 30, a GPU (Graphics Processing Unit) 32, and a main memory 34. These units are connected to each other via a bus 36. An input/output interface 38 is also connected to the bus 36. A communication section 40, a storage section 42, an output section 44, an input section 46, and a recording medium drive section 48 are connected to the input/output interface 38. The communication section 40 includes peripheral device interfaces such as USB (Universal Serial Bus) and IEEE (Institute of Electrical and Electronics Engineers) 1394 and a wired or wireless LAN network interface and establishes communication with the game server 12 and the terminals 24. The storage section 42 includes a hard disk drive, a nonvolatile memory, and the like. The output section 44 outputs data to the spectator display 8 and the administrator display 20. The input section 46 receives input of data from the input apparatus 18. The recording medium drive section 48 drives a removable recording medium such as a magnetic disk, an optical disc, or a semiconductor memory.

The CPU 30 controls the entire live image display support apparatus 10 by executing an operating system stored in the storage section 42. The CPU 30 also executes various programs read from the removable recording medium and loaded into the main memory 34 or downloaded via the communication section 40. The GPU 32 has a function of a geometry engine and a function of a rendering processor. The GPU 32 performs a drawing process according to a drawing command from the CPU 30 and outputs the result to the output section 44. The main memory 34 includes a RAM (Random Access Memory) and stores programs and data necessary for processing. It is noted that the game server 12, the player devices 13, and the terminals 24 may also have similar circuit configurations.

Figure 4:
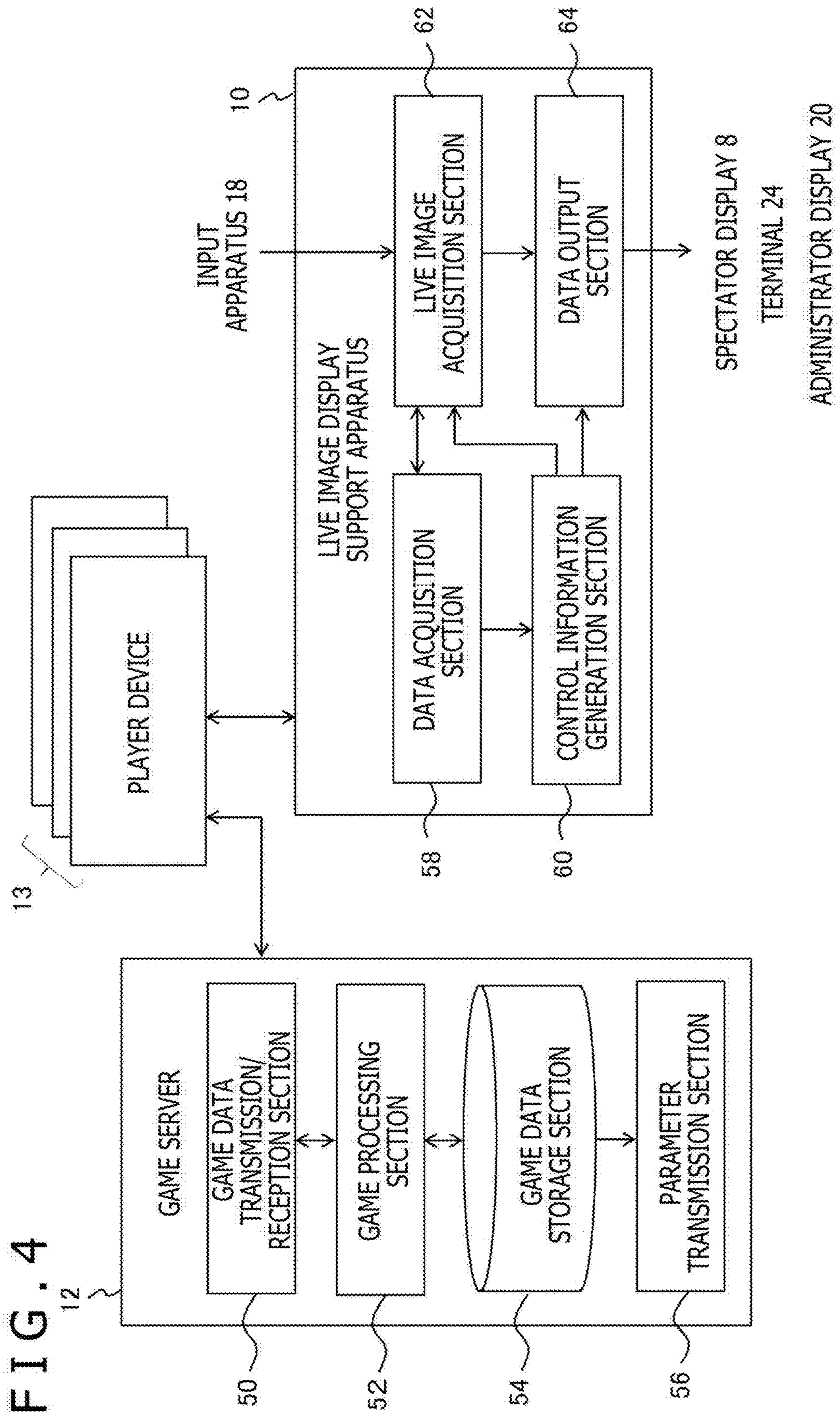
FIG. 4 is a diagram illustrating a configuration of functional blocks of a game server and the live image display support apparatus according to the present embodiment.

FIG. 4 illustrates a configuration of functional blocks of the game server 12 and the live image display support apparatus 10. Each functional block illustrated in the figure can be implemented by, in terms of hardware, the CPU 30, the GPU 32, the main memory 34, or the like illustrated in FIG. 3 and can be implemented by, in terms of software, a program that implements various functions such as an information processing function, an image drawing function, a data input/output function, and a communication function and that is loaded into a memory from a recording medium. Therefore, it is to be understood by those skilled in the art that these functional blocks can be implemented in various forms by hardware only, software only, or a combination of hardware and software and are not limited to any one of these forms.

The game server 12 includes a game data transmission/reception section 50, which exchanges data on a game with each player device 13, a game processing section 52, which processes the game, a game data storage section 54, which stores data on the game, and a parameter transmission section 56, which transmits game parameters to the live image display support apparatus 10.

The game data transmission/reception section 50 immediately receives the operation contents of each player and various kinds of data generated as a result of local game processing in each player device 13. The game data transmission/reception section 50 also immediately transmits various kinds of data generated as a result of processing by the game processing section 52 to the player devices 13. For example, the data are data in which the operation contents of all players are reflected in the game world. The player devices 13 use the data and reflect the data in local game processing.

The game processing section 52 causes the game to progress on the basis of data such as operation contents transmitted from the player devices 13. In other words, the game processing section 52 forms a unified game world in which the operations by all players are reflected. The game processing section 52 supplies the result thereof to the game data transmission/reception section 50 and sequentially stores, in the game data storage section 54, the result including the data transmitted from the player devices 13.

The parameter transmission section 56 reads predetermined game data out of the game data stored in the game data storage section 54, as game parameters according to the present embodiment, and transmits the game parameters to the live image display support apparatus 10. For example, the parameter transmission section 56 acquires and transmits at least one of the following pieces of information.

Battle situation: scores, the number of enemies defeated (the number of kills), possessed weapons, etc.

Location: positions of characters in the virtual world

Action: the types of actions of characters and the types of interaction with other characters (battles, etc.)

It is noted that, in the case of FPS (First Person Shooting) where the field of view of a player is displayed as a player image without displaying the player's own character, the above-described "character" only needs to be replaced with "player." This similarly applies to the following description. However, it is to be understood by those skilled in the art that the type of game to which the present embodiment can be applied is not particularly limited to any type, and that information other than the above-described information can also be collected according to the contents of the game.

The parameter transmission section 56 may transmit situation information at predetermined time intervals or may transmit, whenever there is a change, information corresponding to the change. The timing of transmission may vary depending on the type of game parameters. It is noted that the parameter transmission section 56 may actually be implemented by calling an API (Application Programming Interface) of game software being executed by the game processing section 52.

The live image display support apparatus 10 includes a data acquisition section 58, which acquires game parameters, a control information generation section 60, which generates control information, a live image acquisition section 62, which acquires a live image, and a data output section 64, which outputs data of the live image to the spectator display 8 or the like. The data acquisition section 58 acquires game parameters transmitted from the game server 12 at any time. It is noted that, in a case where a player image is used as the live image, the data acquisition section 58 may acquire frame data of the player image from the corresponding player device 13.

At this time, the data acquisition section 58 accepts specification of a player image, a character, or the like as a display target from the live image acquisition section 62, identifies the corresponding player device 13, and then requests the player device 13 to transmit the player image. The control information generation section 60 acquires game parameters from the data acquisition section 58 and aggregates them to generate control information. Here, the control information generation section 60 updates the control information as needed, such as when a predetermined rate or game parameter changes.

The control information is, for example, information indicating at least one of a character, a location, and a scene suitable for display as the live image, information indicating the priority order of display of at least one of them, or the like. For example, the control information generation section 60 assigns a score to each category from the following perspectives and sorts them in descending order of total score to determine the priority order.

Character: score, the number of kills, the number and level of importance of possessed weapons, the scale of action Location: whether or not a cluster is formed, the scale of the cluster Scene: the level of importance of a scene, such as whether the player is in battle or not For example, a score assignment rule that gives higher priority order to stronger characters, larger clusters, and scenes with a higher level of importance is set up in advance and stored in the control information generation section 60. It is noted that the control information generation section 60 may combine a plurality of above-described perspectives and rank them as the display target. For example, if there are a plurality of locations where clusters of the same scale are formed, higher priority order is given to a cluster having a character with a higher score. If there are a plurality of characters with the same score, higher priority order is given to a character in battle. By evaluating the importance in display from a plurality of perspectives in this way, it is possible to easily display a suitable scene with high accuracy.

The control information generation section 60 may also generate information regarding a suitable position and pose of the virtual camera as the control information. For example, in a case where a location in which a cluster is formed is a display target, the control information generation section 60 may acquire the position and pose of the virtual camera such that the entire cluster fits within the field of view. This makes it easier for spectators to grasp the overall picture of the cluster. However, in this case, if the range of the cluster is too wide, an image of each character may possibly become small, making it difficult to view the movement or making the live image less powerful.

Therefore, the control information generation section 60 may limit the field of view according to a predetermined rule. In this case as well, the control information generation section 60 may select targets to be included in the field of view, by prioritizing regions within the cluster from the perspectives as described above. Further, the control information generation section 60 may generate control information by using information other than game parameters. For example, the control information generation section 60 may use the three-dimensional structure of the virtual world to prioritize display targets and determine the position and pose of the virtual camera.

Here, the three-dimensional structure of the virtual world includes the inclination angle and height of the ground, the arrangement and height of buildings, and the like. For example, in a case where characters forming a cluster are distributed on a slope or a cliff of a mountain, the pose of the virtual camera is derived such that a screen faces the slope or the cliff. This makes it possible to grasp, at a glance, a top-bottom relation of the positions where the characters are present. Further, a region that is difficult to view due to the relation between the inclination of the ground and the pose of the virtual camera is excluded from the field of view even if the region is within the range of the cluster, so that the above-described limitation of the field of view can appropriately be realized.

The control information generation section 60 may perform either one of determination or prioritization of an optimum display target and derivation of a suitable position and pose of the virtual camera or may perform both of them. For example, even in a case where the display target is fixed due to the nature of the game, it is possible to represent the live image at a suitable angle with the function of the control information generation section 60. Alternatively, even in a case where a player image is used as the live image, it is possible to easily select an image including an optimum display target. Needless to say, the control information generation section 60 may determine an optimum display target and then determine a suitable position and pose of the virtual camera with respect to the optimum display target.

The live image acquisition section 62 acquires the live image on the basis of the control information. For example, the live image acquisition section 62 sets the position and pose of the virtual camera according to the control information and then draws the virtual world of the game to generate the live image. Alternatively, the live image acquisition section 62 selects a player image to be used as the live image, on the basis of a suitable display target and the priority order which are indicated by the control information. In this case, the live image acquisition section 62 requests a player image including the determined display target from the data acquisition section 58 and acquires the player image transmitted from the corresponding player device 13.

The live image acquisition section 62 may continue to generate the live image by itself or may continue to acquire the selected player image. In the latter case, the player image to be acquired may appropriately be switched on the basis of the control information. Alternatively, the live image acquisition section 62 may switch between an image generated by itself and a player image as the live image. It is noted that, as described above, the live image acquisition section 62 may accept, via the input apparatus 18, virtual camera control or a screen switching operation performed by the live image administrator and generate the live image or acquire the player image accordingly.

In any mode, the live image acquisition section 62 may superimpose and display, on the live image, various pieces of information that are not displayed on the player displays 16. For example, the live image acquisition section 62 may represent which player each character in the live image corresponds to by letters or graphics and indicate a score, a hit point, a list of possessed weapons and the like, provisional ranking, and the like of each character. This makes it easier for spectators to understand the scene and the situation of the game represented by the live image.

The data output section 64 sequentially outputs the frame data of the live image acquired by the live image acquisition section 62, to cause the spectator display 8, the terminals 24, and the administrator display 20 to display the frame data. In a mode in which the live image administrator performs a field-of-view control or switching operation of the live image, the data output section 64 further causes the administrator display 20 to display the control information. For example, the data output section 64 represents information such as the priority order of a display target and a suitable position and pose of the virtual camera by using letters or graphics. Alternatively, the data output section 64 may process the live image being displayed, to highlight a character to be placed in the center next.

Figure 5:
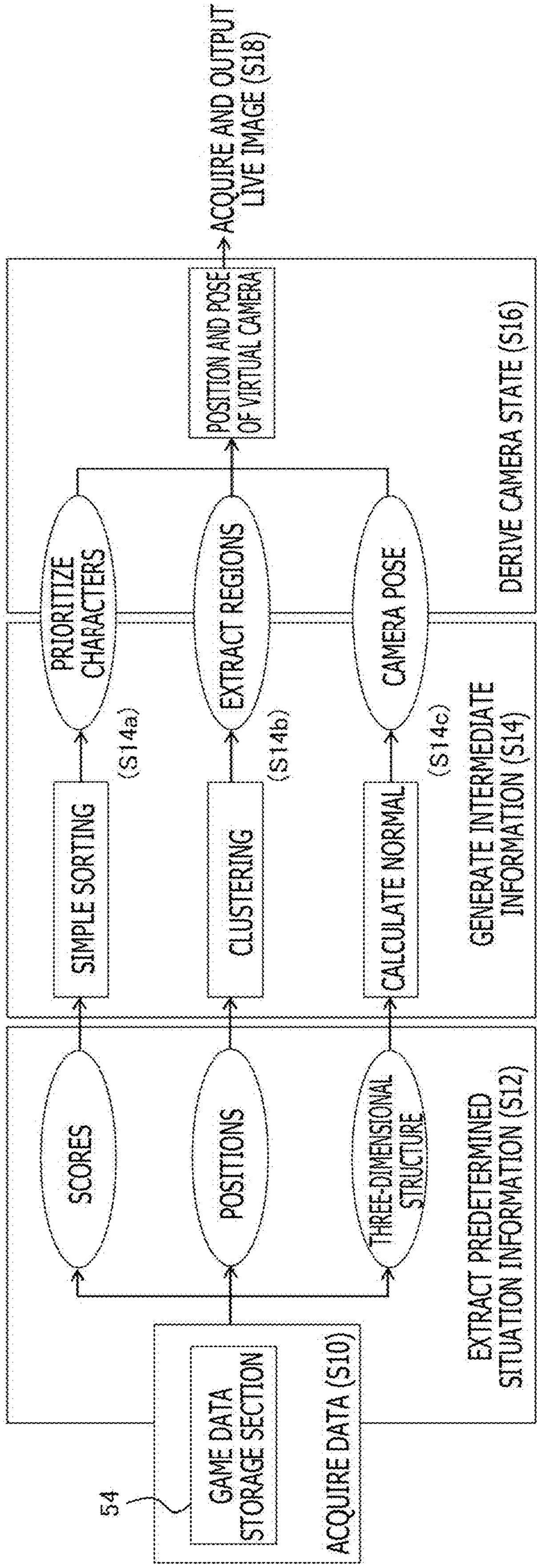
FIG. 5 is a diagram illustrating a processing procedure for controlling a live image and transition of data in the present embodiment.

Next, the operation of the game system that can be implemented by the above configuration is described. FIG. 5 illustrates a processing procedure for controlling the live image and the transition of data in the present embodiment. Here, it is assumed that the player devices 13 and the game server 12 cooperate to continue the game processing corresponding to the operations performed by the players. In this process, the game data storage section 54 of the game server 12 continues to store various kinds of game data including game parameters according to the present embodiment (S10).

The parameter transmission section 56 of the game server 12 extracts predetermined game parameters from the game data storage section 54, for example, by using an API provided by game software (S12). In the illustrated example, the score and position of each character (player) are extracted as the game parameters. In this example, moreover, the API also provides data representing the three-dimensional structure of the virtual world. These pieces of data are transmitted from the parameter transmission section 56 to the live image display support apparatus 10. It is noted that the live image display support apparatus 10 may acquire the data representing the three-dimensional structure of the virtual world in advance.

The control information generation section 60 of the live image display support apparatus 10 generates control information by using the game parameters and data of the three-dimensional structure transmitted. In this example, first, the control information generation section 60 generates intermediate information directly acquired from those pieces of data (S14) and then derives the position and pose of the virtual camera (S16). Specifically, the control information generation section 60 simply sorts the scores to prioritize characters to be displayed (S14*a*). Further, the control information generation section 60 performs clustering on the basis of pieces of position information of the characters to extract regions of display target candidates (S14*b*).

By comprehensively evaluating these pieces of information, it is possible to derive an optimal display target, such as, for example, a location where a cluster to which the strongest character belongs is formed. Once the approximate positions of such a display target and, further, the virtual camera are determined, the control information generation section 60 further calculates the normal of the terrain or the like by using the data of the three-dimensional structure of the location, to derive a suitable pose of the virtual camera (S14*c*). At this time, the control information generation section 60 may adjust the position of the virtual camera to obtain a suitable field of view on the basis of the three-dimensional structure.

According to the position and pose of the virtual camera derived by the processing above, the live image acquisition section 62 acquires the live image by, for example, drawing the game world in the corresponding field of view and outputs the live image to the spectator display 8 and the like (S18). By repeating the illustrated processing at a predetermined frequency or as necessary, it is possible to keep displaying a suitable live image in such a manner as to correspond to changes in the game situation. However, the illustrated procedure and used data are examples only and do not limit the present embodiment.

Figure 6:
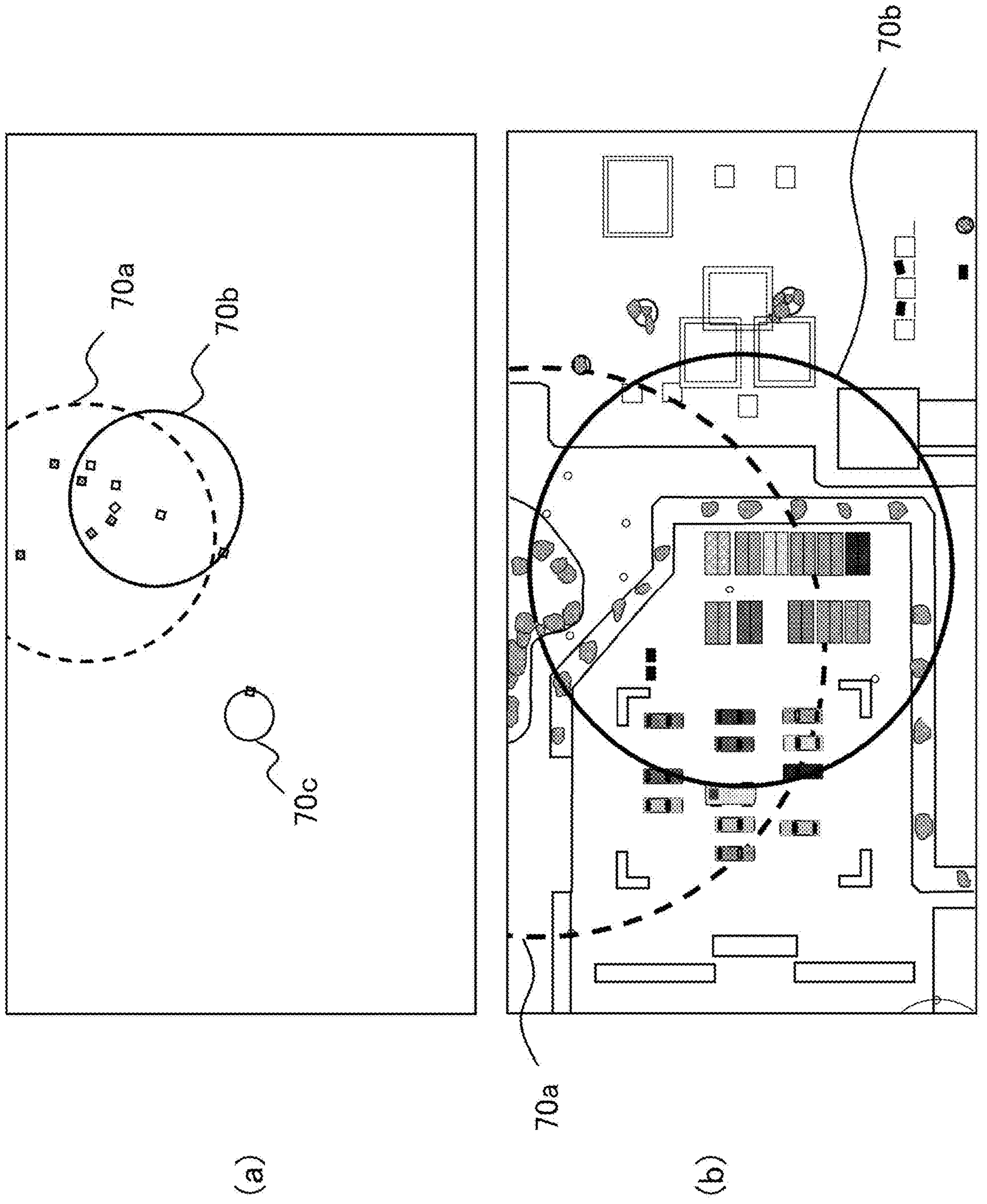
FIG. 6 is a view for describing an example of determining a suitable position of a virtual camera on the basis of clustering in the present embodiment.

FIG. 6 is a view for describing an example of determining a suitable position of the virtual camera on the basis of clustering. (a) illustrates the distribution of characters in the virtual world. The control information generation section 60 performs clustering by using a general algorithm such as a k-means method, on the basis of the position coordinates of each character indicated by a rectangle in the figure. In the illustrated example, three clusters 70*a*, 70*b*, and 70*c* are detected. In a case where a plurality of clusters are formed in this way, the control information generation section 60 selects one of the clusters as a display target according to a predetermined rule.

For example, the control information generation section 60 selects a cluster to which a character with the highest score or number of kills belongs or a cluster with the highest total or average score or number of kills by characters belonging to the cluster. There are no particular limitations on the game parameters used for cluster selection, such as the scale of movement and the type of action, in addition to the scores and the number of kills. For example, clusters may be scored from a plurality of perspectives and a cluster with the highest score may be selected, as described above. At this time, various parameters that are not displayed on the player displays 16 (not known to the players) may be added.

For example, the priority order of display corresponding to the attributes, contracts, and the like of players may be set to characters in advance, and the priority order may be reflected in the score of each cluster. Alternatively, a cluster satisfying a predetermined condition may immediately be selected without comparison of scores. For example, a cluster to which a character who is predetermined to continue to be displayed belongs or to which a character holding a predetermined important object in the game belongs may be selected without comparison with other clusters.

Further, upper and lower limits may be set for the area of a cluster or the number of characters belonging to the cluster, and any cluster that deviates from these limits may be excluded from options or its priority order may be lowered. Accordingly, for example, it is possible to avoid, as much as possible, displaying a cluster in which individual characters are difficult to view due to an excessively large area or a cluster in which the number of characters is small and the scene is likely to lack excitement. After selecting one cluster 70*b* through the selection process as described above, the control information generation section 60 derives a suitable position of the virtual camera according to the position and area of the cluster 70*b*.

For example, the control information generation section 60 performs alignment such that an optical axis of the virtual camera matches the center of gravity of the cluster 70*b*. Further, the control information generation section 60 determines the height of the virtual camera relative to the ground such that the diameter of the cluster 70*b* occupies a predetermined proportion such as 90% of the size of a screen in a short direction. (b) of the figure schematically illustrates the live image acquired by the live image acquisition section 62 by setting the virtual camera in this way. This example illustrates how characters are dispersed in an outdoor parking lot or the like. Here, the pose of the virtual camera is such that an imaging plane (view screen) faces the ground, which is a horizontal plane.

It is noted that the position and pose of the virtual camera are not limited to being fixed as they are, but may be caused to change over time within a predetermined range centering on that state to give dynamism to a video. The operation may be automatically performed by the live image acquisition section 62 according to a preset rule or may be manually performed by the live image administrator. Further, as described above, the live image acquisition section 62 may superimpose and display additional information, such as the names of the players corresponding to the characters, the identification of the team, and a list of scores, on the live image. The live image illustrated in the figure allows spectators to look over the overall appearance of the characters gathering and fighting at an easy-to-view magnification.

Figure 7:
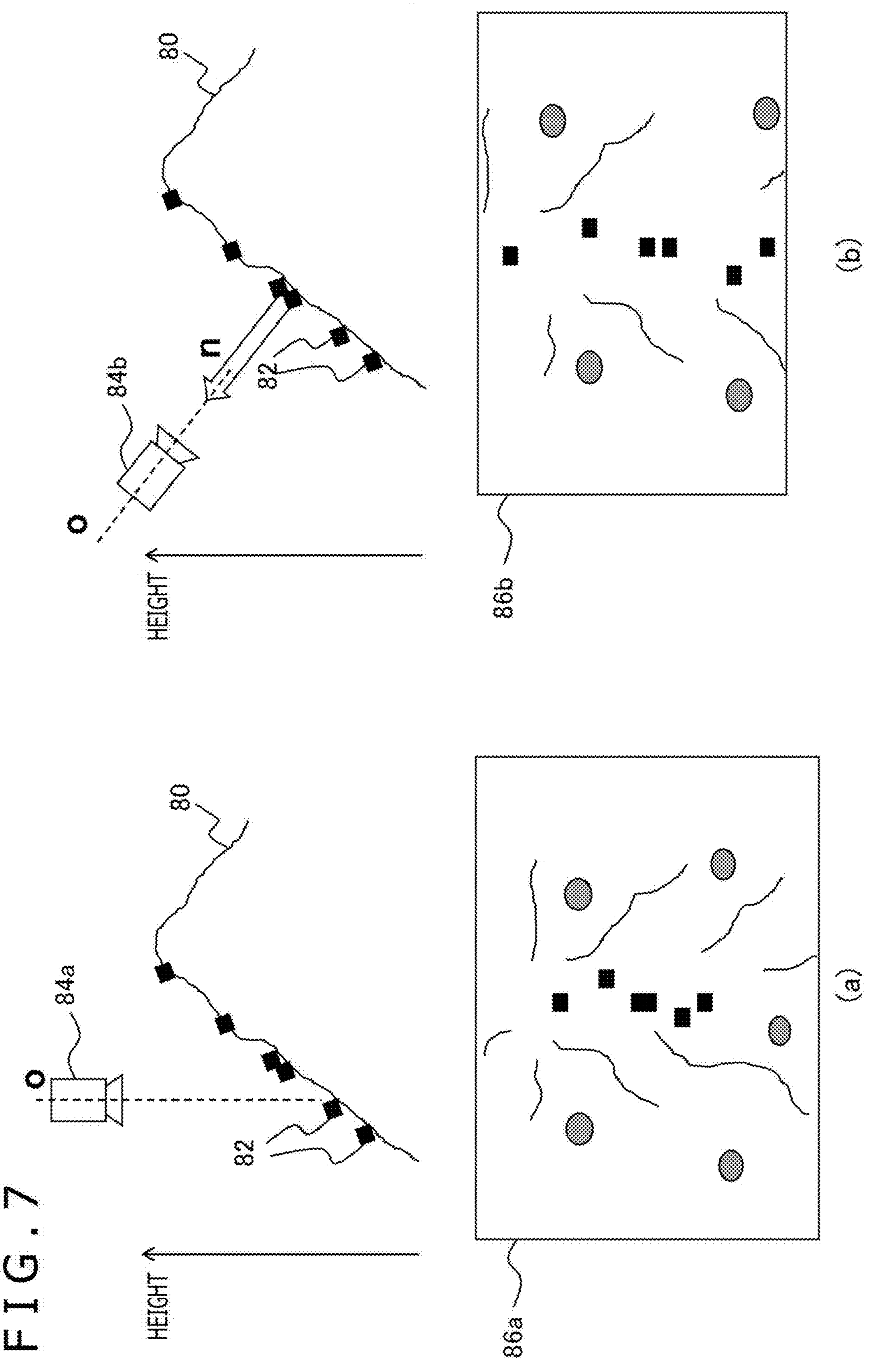
FIG. 7 is a view for describing an example of determining a pose of the virtual camera in consideration of the three-dimensional structure of a virtual world in the present embodiment.

FIG. 7 is a view for describing an example of determining the pose of the virtual camera in consideration of the three-dimensional structure of the virtual world. Upper parts of (a) and (b) represent the height of the ground in the virtual world in a longitudinal direction of the figure. This example illustrates characters (e.g., characters 82) indicated by rectangles forming a cluster on a slope of a mountain 80 in the virtual world. When the cluster is detected as described with reference to FIG. 6 and a virtual camera 84*a* is set vertically downward as illustrated in the upper part of (a), a live image 86*a* illustrated in a lower part thereof is generated.

In this case, the distance between characters decreases according to the inclination, making it difficult to grasp the actual positional relation. As the inclination of the mountain 80 becomes steeper and closer to a cliff, the characters in the live image overlap with each other, becoming more difficult to view. Therefore, the control information generation section 60 adjusts the pose of the virtual camera on the basis of the three-dimensional structure of the virtual world as a display target. Specifically, as illustrated in the upper part of (b), the control information generation section 60 acquires a normal vector n of the ground as the display target and derives the pose of a virtual camera 84*b* such that an optical axis o matches the normal vector n.

Here, the normal vector n only needs to be obtained for a point represented in the center of the live image, for example. In a case where a cluster is a display target as in FIG. 6, the center of gravity of the cluster corresponds to this. In this case, as in FIG. 6, the height of the virtual camera 84*b* is adjusted such that the entire cluster fits within the angle of view. With this configuration, as illustrated in the lower part of (b), it is possible to display a live image 86*b*, which represents the actual distance between the characters. In this case as well, the position and pose of the virtual camera may be caused to change over time within a predetermined range to make the relation between the characters and the slope easier to understand.

Figure 8:
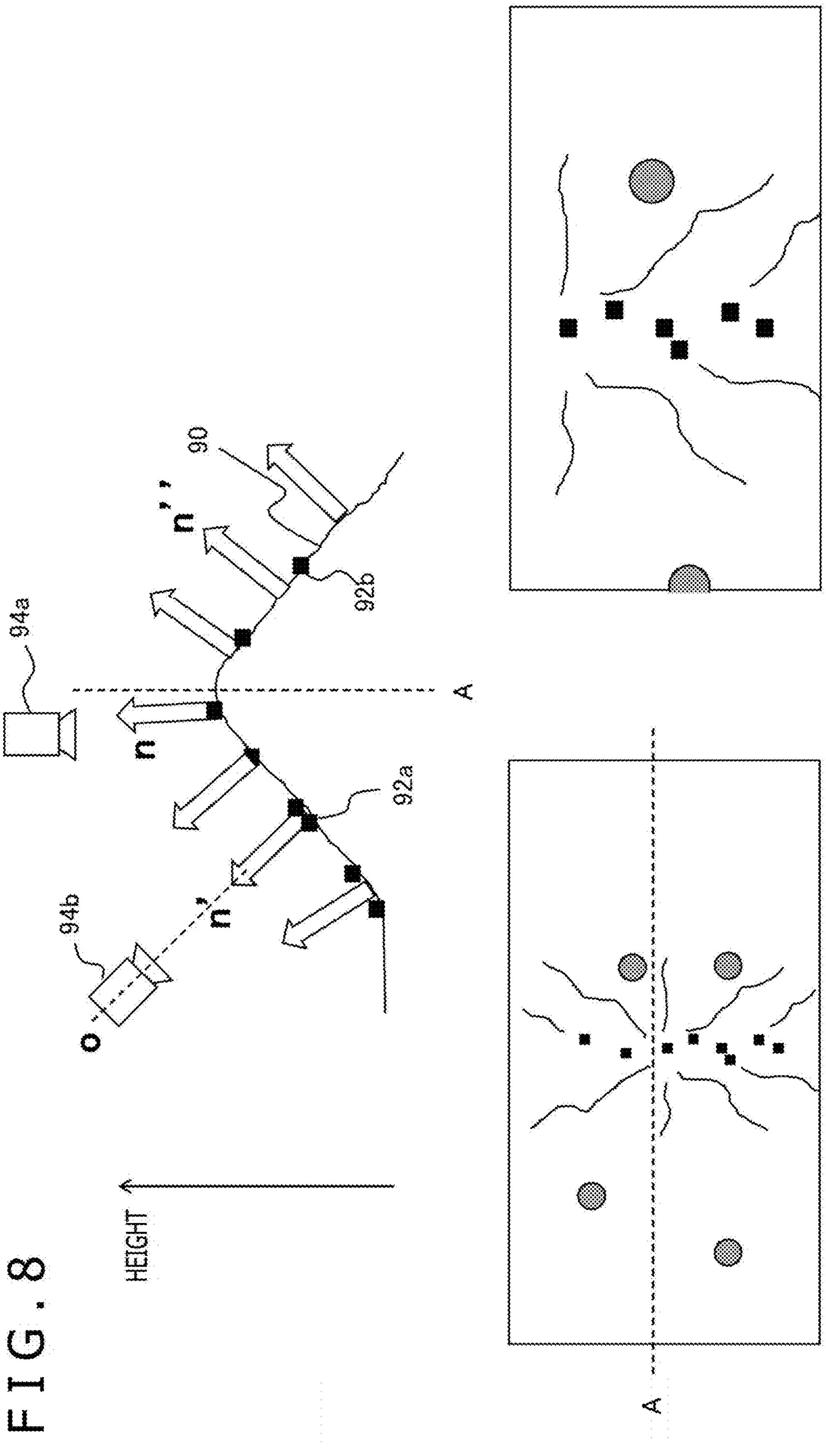
FIG. 8 is a view for describing an example of determining the position and pose of the virtual camera in consideration of the three-dimensional structure of the virtual world in the present embodiment.

FIG. 8 is a view for describing an example of determining the position and pose of the virtual camera in consideration of the three-dimensional structure of the virtual world. An upper part represents the height of the ground in the virtual world in a longitudinal direction of the figure. This example also illustrates how characters indicated by rectangles form a cluster on slopes of a mountain 90 in the virtual world. However, in this case, the characters (e.g., characters 92*a* and 92*b*) are distributed not only on a slope on one side of the mountain 90 but also on a slope on the other side beyond a summit A. When the cluster is detected as described with reference to FIG. 6 and a virtual camera 94*a* is set vertically downward, a live image is generated as illustrated in (a) of a lower part.

As described with reference to FIG. 7, deriving the pose of the virtual camera based on the normal vector n at the center of gravity of a cluster also yields approximately the same result. As a result, as with the case of FIG. 7, the distance between the characters reduces, making it difficult to grasp the actual positional relation. Further, in this case, if the position of the summit A is unknown, it is difficult to grasp the vertical positional relation of the characters. Therefore, as indicated by arrows in the figure, the control information generation section 60 acquires normal vectors of the ground at predetermined intervals in a display range within or including the cluster, for example.

Then, on the basis of the relation between these angles, the control information generation section 60 limits the range of the display target in the cluster. For example, the control information generation section 60 divides the cluster into regions according to the ranges of angles of the normal vectors. Then, the control information generation section 60 excludes, from the display target, any region having a normal vector forming an angle equal to or greater than a predetermined angle, such as 90°, with respect to a normal vector (e.g., a normal vector n') at the center of gravity of the largest region among the regions. The angle between normal vectors can be calculated by an inner product or the like. In the illustrated example, the region of the slope on the opposite side of the summit A is excluded on the basis of a normal vector n".

Then, the position and pose of a virtual camera 94*b* are derived as described with reference to FIG. 7, for a new cluster formed by the remaining characters (e.g., the characters 92*a*). That is, an optical axis o of the virtual camera 94*b* is caused to match a normal vector (e.g., a normal vector n') at the center of gravity of the new cluster, and the height of the virtual camera 94*b* is adjusted such that the entire cluster is included in the angle of view. In this way, as illustrated in (b), it is possible to display a live image representing the actual distance and top-bottom relation between the characters.

Further, since the regions that cannot be viewed from the virtual camera 94*b* are excluded from the cluster serving as the display target, only the remaining characters can be displayed at a high magnification. It is noted that, although the mountain in the virtual world is exemplified in the figure, a suitable position and pose of the virtual camera can similarly be derived for buildings, the bottom of the sea, and the like. Further, in this description, for the location where a cluster is detected, the control information generation section 60 obtains a normal vector on the spot and generates the control information in consideration of the inclination. By contrast, the control information generation section 60 may perform region division in advance within a range of the inclination angle of the ground by, for example, acquiring the distribution of normal vectors for all the regions of the virtual world.

For example, the control information generation section 60 may prepare a terrain map in which regions are tagged according to the type of three-dimensional structure such as a plain, a mountain, a valley, or a building, by using a three-dimensional model of the virtual world. In this case, like the mountain 90 illustrated in the figure, in the case of a terrain with adjacent slopes having an angle that would not be captured in a case where the virtual camera is set to face one slope, clustering may be performed under a condition that the boundary between the slopes is not straddled in the first place.

Figure 9:
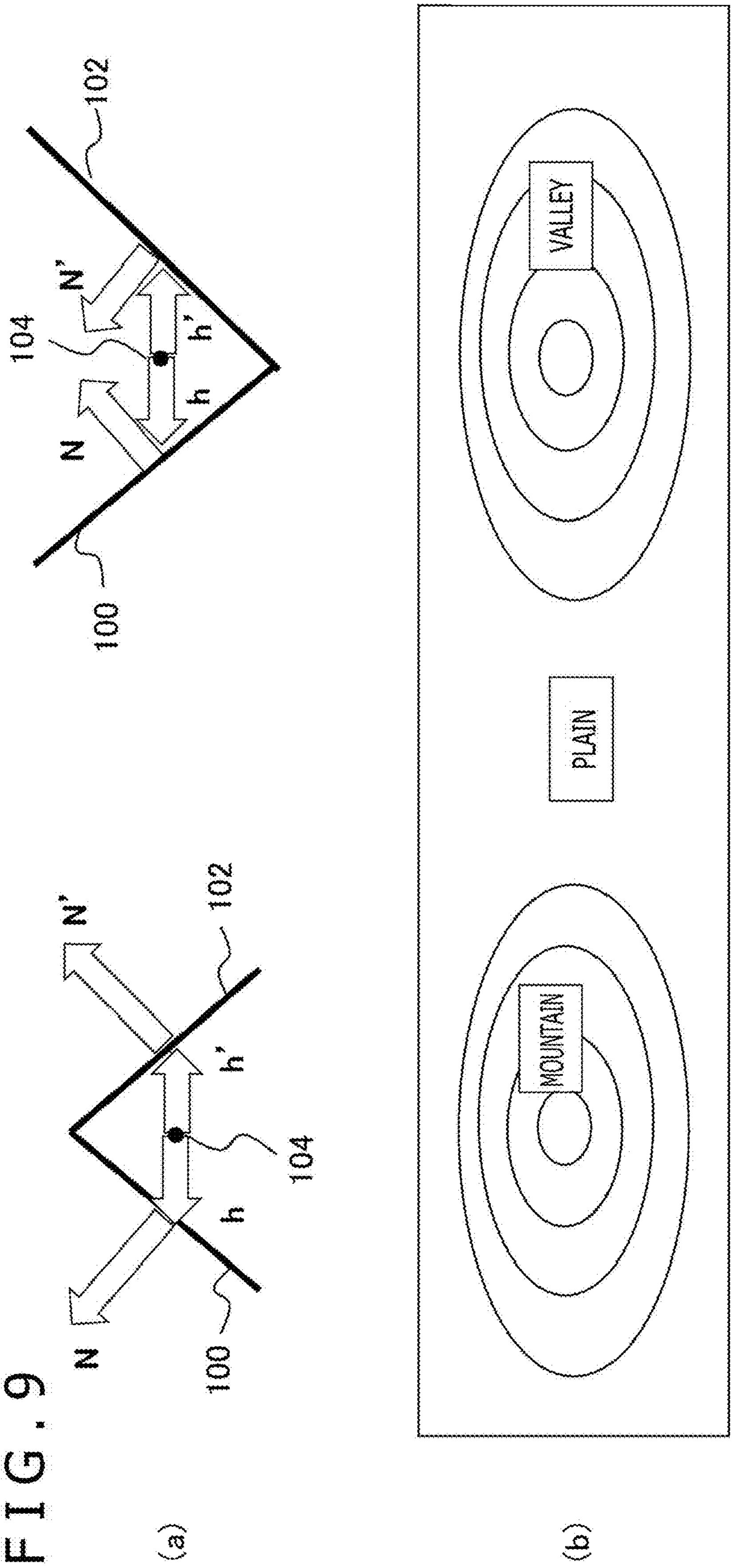
FIG. 9 is a diagram for describing a method for generating a terrain map by a control information generation section in the present embodiment.

FIG. 9 is a diagram for describing a method for generating a terrain map by the control information generation section 60. First, the control information generation section 60 uses the distribution of normal vectors acquired at predetermined intervals, to divide regions of the virtual world on the basis of the angular range thereof. For example, a region in which the inner product of normal vectors at the predetermined intervals continues to be a positive predetermined value or more is determined as a plain or a gentle slope. Since the other regions are mountains or valleys, the control information generation section 60 determines which one they are as illustrated in (a) of the figure.

That is, focusing on two surfaces 100 and 102 whose inner product is equal to or less than the predetermined value and thus having a sharp angle change, the control information generation section 60 sets vectors h and h' directed from a midpoint 104 of the center of gravity of these surfaces toward the center of gravity of each of the surfaces 100 and 102. Then, the control information generation section 60 respectively calculates the inner products of the vectors h and h' and normal vectors N and N' of the surfaces 100 and 102 at points at which the respective vectors h and h' reach. In a case where the inner product is positive, the control information generation section 60 determines that the surfaces 100 and 102 form a mountain as illustrated on the left side of (a). In a case where the inner product is negative, the control information generation section 60 determines that the surfaces 100 and 102 form a valley as illustrated on the right side of (a).

By changing the orientations of the vectors h and h', it is possible to acquire a change in the mountain and valley on the basis of the orientations. By performing such calculation, the control information generation section 60 can add tags such as a "plain," a "mountain," and a "valley" to locations in the virtual world, like the terrain map illustrated in (b) of the figure. However, the above-described calculation method is an example only, and it is to be understood by those skilled in the art that there are various possible methods for identifying the type of three-dimensional structure with use of the three-dimensional model of the virtual world.

In any case, the control information generation section 60 can efficiently generate the control information by acquiring the terrain map in advance. For example, as described above, the control information generation section 60 can perform clustering in such a manner as not to straddle the summit or ridge of a mountain. Further, it is also possible to switch a policy for determining the position and pose of the virtual camera, depending on the type of terrain. For example, as illustrated in FIGS. 7 and 8, in the case of a cluster formed on a mountain, the pose of the virtual camera may be such that the virtual camera faces a slope on one side while, in the case of a cluster formed on a valley, the pose of the virtual camera may be such that the virtual camera faces a horizontal direction in such a manner as to capture both slopes.

Figure 10:
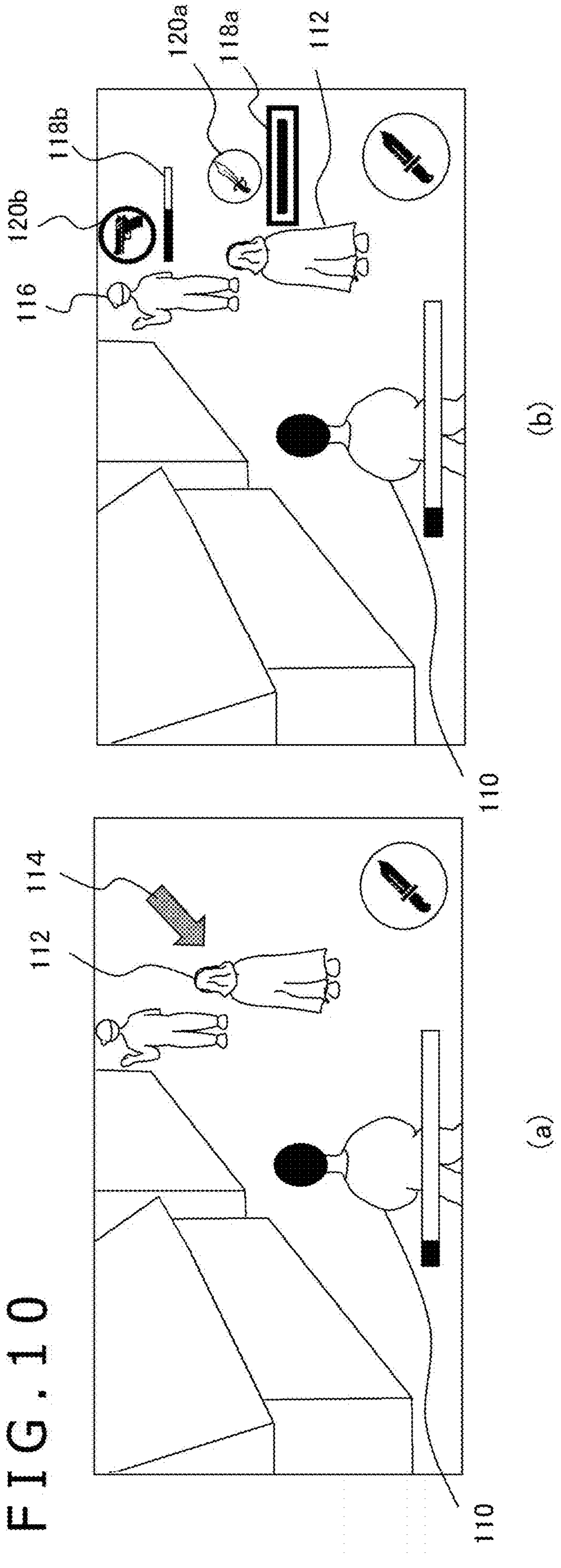
FIG. 10 is a view exemplifying screens for an administrator displayed on an administrator display by the live image display support apparatus in a mode in which a live image administrator controls the live image in the present embodiment.

FIG. 10 exemplifies screens for an administrator displayed on the administrator display 20 by the live image display support apparatus 10 in a mode in which the live image administrator controls the live image. In this example, it is assumed that the display target is set for each character. In this case, it is conceivable to use, as the live image, a player image corresponding to a character as the display target. However, there is no intention to limit the present invention thereto.

The examples illustrated in (a) and (b) of the figure each illustrate an image for the administrator based on the live image being displayed. In other words, the display target at this time is a character 110, a back view of the character 110 is placed in the vicinity of the bottom of the center, and its surrounding virtual world is represented at a predetermined angle of view in the live image. Here, for example, in a case where the HP of the character 110 falls below a predetermined value, it is conceivable to change the display target to another character. The control information generation section 60 may continue to update the priority order of display given to the characters on the basis of the above-described game parameters, without limiting to the HP, and recommend changing the display target, when the highest-ranking character is replaced.

It is noted that the control information generation section 60 may set a lower limit on the time interval for changing the display target, such that the display target is not changed too frequently. When a condition for changing the display target to a character 112 is satisfied, the control information generation section 60 highlights the character 112 as illustrated in (a), to recommend the live image administrator in this regard. In this example, an arrow 114, which points to the character 112, is superimposed and displayed.

The live image administrator who has recognized by the arrow 114 that it is desirable to change the display target to the character 112 performs input to confirm the change of the display target via the input apparatus 18, for example. In response, the live image acquisition section 62 starts acquiring a live image in which the character 112 is placed in the vicinity of the bottom of the center. This image may be a player image of a player operating the character 112 or may be an image separately generated by the live image acquisition section 62 with the virtual camera brought closer to the character 112.

Through these processes, the character mainly displayed in the live image is switched from the character 110 to the character 112. It is noted that means for indicating the next display target candidate on the screen for the administrator is not limited to the arrow 114. For example, the outline of the character may be represented in a different color, or the entire silhouette may be masked with a predetermined color.

By contrast, the control information generation section 60 may display information that serves as a reference allowing the live image administrator to make a final determination, without specifying the next display target. For example, as illustrated in (b), among game parameters of candidate characters 112 and 116, game parameters that can be a basis to become the display target are displayed. In this example, gauges 118*a* and 118*b*, which represent the HPs, and icons (e.g., icons 120*a* and 120*b*), which represent possessed weapons, are represented in the vicinity of the character 112 and 116, respectively.

Among these, a basis for selecting the character 112 is the HP close to 100%. Therefore, the gauge 118*a* is highlighted with a bold line around the gauge 118*a*. Meanwhile, a basis for selecting the character 116 is the possessed weapon. Therefore, the icon 120*b* is highlighted with a bold line around the icon 120*b*. The live image administrator determines by himself/herself which basis is effective and selects one of the characters with an unillustrated cursor or the like to confirm and input the next display target. Subsequent processing by the live image acquisition section 62 is similar to that in the case of (a).

It is noted that, in this case as well, there is no particular limitation on how game parameters such as gauges and weapons are highlighted, as long as the administrator can easily recognize them. Further, in the case of using a quantitatively comparable game parameter such as the degree of rarity of a weapon, an HP, or a past battle record of a corresponding player, a list of results sorted by category can be displayed or the ranking may be displayed in the vicinity of each character, such that the administrator can recognize the priority order. Further, in a case where a character or a cluster that is not included in the live image and is present in another location is a candidate for the next display target, an image or map with a bird's eye view of the virtual world may separately be displayed to allow selection thereof.

It is noted that the information to be presented to the live image administrator is not limited to the one illustrated in the figure and may be any control information. For example, the control information generation section 60 may display information regarding suitable positions and poses of virtual cameras and the priority order thereof and allow the administrator to select one of them. At this time, the control information generation section 60 may further accept a fine correction of the position and pose of a virtual camera from the live image administrator. Alternatively, the control information generation section 60 may give the live image administrator a notification that a battle has started in a location that is not being displayed, and accept switching of the display target. After that, the control information generation section 60 may further accept, from the live image administrator, detailed specifications such as the state of the virtual camera in this location and the selection of a character to be mainly displayed.

According to the present embodiment described above, in an electronic game such as e-sports, predetermined game parameters are extracted from data acquired in the course of game processing and are used to generate control information relating to a suitable field of view of a live image. This facilitates the work of generating a live image or selecting one from player images according to the progress of the game. As a result, a suitable live image can be displayed regardless of the skill levels of staff or the number of staff, and an exciting event can be realized at a low cost.

Not only individual characters but also clusters of characters are also display target candidates of the live image. This makes it possible to convey an entire large-scale scene such as a team battle in an easy-to-understand manner. Meanwhile, it is possible to efficiently represent an important part of the game in an easy-to-view manner by narrowing down the display target according to a predetermined rule or by adjusting the position and pose of the virtual camera in consideration of the three-dimensional structure of the virtual world. By deriving a suitable position and pose of the virtual camera as the control information for the live image, the live image can be controlled not only manually but also completely automatically. The embodiment can flexibly be set depending on the scale of the event, funds, the contents of the game, the processing power of apparatuses, or the like.

The present invention has been described above on the basis of the embodiment. The above-described embodiment is an example only, and it is to be understood by those skilled in the art that various modifications can be made to combinations of the individual constituent components and individual processes of the embodiment and that such modifications also fall within the scope of the present invention.

INDUSTRIAL APPLICABILITY

As described above, the present invention is applicable to various information processing apparatuses, such as a live image display apparatus, a game server, and a personal computer, a game system including them, and the like.

REFERENCE SIGNS LIST

8: Spectator display
10: Live image display support apparatus
12: Game server

13: Player device
14: Input apparatus
16: Player display
18: Input apparatus
20: Administrator display
22: Network
24: Terminal
30: CPU
32: GPU
34: Main memory
40: Communication section
42: Storage section
44: Output section
46: Input section
48: Recording medium drive section
50: Game data transmission/reception section
52: Game processing section
54: Game data storage section
56: Parameter transmission section
58: Data acquisition section
60: Control information generation section
62: Live image acquisition section
64: Data output section

The invention claimed is:

1. A live image display support apparatus that supports display of a live image of an electronic game, comprising:

one or more processors; and one or more memories storing instructions that, when executed by the one or more processors, cause the one or more processors to perform operations comprising:

extracting predetermined game parameters acquired in game processing based on an operation performed by a player of a plurality of players, wherein the predetermined game parameters comprise position information of characters operated by respective players in a virtual world of the electronic game; and generating and outputting control information relating to a suitable field of view of the live image by:

aggregating the predetermined game parameters;

clustering the predetermined game parameters into a plurality of clusters on a basis of the position information; and selecting a cluster from the plurality of clusters as a display target for the live image on a basis of characters belonging to the cluster.

2. The live image display support apparatus according to claim 1, wherein the control information comprises state information of a virtual camera with respect to the live image.

3. The live image display support apparatus according to claim 2, wherein the operations further comprise generating the state information of the virtual camera on a basis of a three-dimensional structure of the virtual world of the electronic game.

4. The live image display support apparatus according to claim 3, wherein the operations further comprise acquiring a normal vector of a slope in the virtual world and obtaining a pose of the virtual camera such that the normal vector matches an optical axis.

5. The live image display support apparatus according to claim 2, the operations further comprise setting the virtual camera according to the state information and then generating the live image.

6. The live image display support apparatus according to claim 1, wherein the operations further comprise limiting a region associated with the display target on a basis of a three-dimensional structure of the virtual world of the electronic game.

7. The live image display support apparatus according to claim 6, wherein the operations further comprise:

generating a terrain map in which a type of structure is associated with the region, on a basis of the three-dimensional structure of the virtual world of the electronic game, and switching a policy for setting a virtual camera for representing the cluster on the live image, according to the type of structure.

8. The live image display support apparatus according to claim 1, wherein the operations further comprise acquiring, as the predetermined game parameters, at least one of a battle situation of each player of the plurality of players and a type of action being performed by each player of the plurality of players.

9. The live image display support apparatus according to claim 1, wherein the operations further comprise prioritizing display targets according to a predetermined rule by using the predetermined game parameters as the control information.

10. The live image display support apparatus according to claim 1, wherein the operations further comprise causing an administrator display viewed by a live image administrator to display the control information.

11. The live image display support apparatus according to claim 10, wherein the operations further comprise:

highlighting a character to be a next display target among the characters operated by respective players in the virtual world of the electronic game and accepting a confirmation input performed by the live image administrator.

12. The live image display support apparatus according to claim 10, wherein the operations further comprise:

displaying, in a vicinity of a candidate of a character to be a next display target among the characters operated by respective players in the virtual world of the electronic game, the predetermined game parameters serving as a basis on which the character is to be the display target, and accepting an input of selection of the character, the input being performed by the live image administrator.

13. The live image display support apparatus according to claim 1, wherein the operations further comprise acquiring data of a player image that is to be used as the live image and that is selected on a basis of the control information among player images viewed by respective players for gameplay.

14. A game system comprising:

a game server configured to process an electronic game in cooperation with player devices and output predetermined game parameters acquired in game processing based on an operation performed by a player of a plurality of players, wherein the predetermined game parameters comprise position information of characters operated by respective players in a virtual world of the electronic game; and a live image display support apparatus communicatively coupled to the game server and configured to generate and output control information relating to a suitable field of view of a live image of the electronic game by:

aggregating the predetermined game parameters;

clustering the predetermined game parameters into a plurality of clusters on a basis of the position information; and selecting a cluster from the plurality of clusters as a display target for the live image on a basis characters belonging to the cluster.

15. A live image display support method that supports display of a live image of an electronic game, the method comprising:

extracting predetermined game parameters acquired in game processing based on an operation performed by a player of a plurality of players, wherein the predetermined game parameters comprise position information of characters operated by respective players in a virtual world of the electronic game; and generating and outputting control information relating to a suitable field of view of the live image by:

aggregating the predetermined game parameters;

clustering the predetermined game parameters into a plurality of clusters on a basis of the position information; and selecting a cluster from the plurality of clusters as a display target for the live image on a basis of characters belonging to the cluster.

16. A non-transitory, computer-readable storage medium containing a computer program, which when executed by a computer that supports display of a live image of an electronic game, causes the computer to perform a live image display support method by carrying out actions, comprising:

extracting predetermined game parameters acquired in game processing based on an operation performed by a player of a plurality of players, wherein the predetermined game parameters comprise position information of characters operated by respective players in a virtual world of the electronic game; and generating and outputting control information relating to a suitable field of view of the live image by:

aggregating the predetermined game parameters;

clustering the predetermined game parameters into a plurality of clusters on a basis of the position information; and selecting a cluster from the plurality of clusters as a display target for the live image on a basis of characters belonging to the cluster.

* * * * *